United States Patent

Lu et al.

Patent Number: 5,351,184
Date of Patent: Sep. 27, 1994

[54] METHOD OF MULTIVARIABLE PREDICTIVE CONTROL UTILIZING RANGE CONTROL

[75] Inventors: Zhuxin J. Lu, Glendale; J. Ward MacArthur, Scottsdale; Brian C. Horn, Phoenix, all of Ariz.

[73] Assignee: Honeywell Inc., Minneapolis, Minn.

[21] Appl. No.: 9,491

[22] Filed: Jan. 26, 1993

[51] Int. Cl.$^5$ .................. G06F 15/46; G05B 13/02
[52] U.S. Cl. ..................... 364/165; 364/152; 364/157
[58] Field of Search .............. 364/148, 149–151, 364/152–156, 157, 164, 165, 176; 318/561

[56] References Cited

U.S. PATENT DOCUMENTS

| | | | |
|---|---|---|---|
| 4,349,869 | 9/1982 | Prett et al. | 364/156 X |
| 4,916,635 | 4/1990 | Singer et al. | 364/153 X |
| 5,184,292 | 2/1993 | Schneider | 364/153 X |

*Primary Examiner*—Joseph Ruggiero
*Attorney, Agent, or Firm*—A. A. Sapelli; A. Medved; W. Udseth

[57] ABSTRACT

A process control system which includes at least one manipulated variable and at least one controlled variable, provides a method for robust control of a process. Predetermined constraints of the manipulated variables and the controlled variables, and the present values of the manipulated variables are obtained. New values are calculated for the controlled variables for a predetermined number of points in the future, such that the values of the controlled variables are within the predetermined range thereby obtaining an optimal robustness of the resultant controller. The manipulated variables are also calculated to be within predetermined constraints, and the controlled variables to fall within a predetermined range when controllable. From a plurality of solutions, a most robust solution is selected. Then the manipulated variables are adjusted to cause the process control system to drive the values of the controlled variables to the calculated values.

3 Claims, 3 Drawing Sheets

METHOD OF MULTIVARIABLE PREDICTIVE CONTROL UTILIZING RANGE CONTROL

BACKGROUND OF THE INVENTION

The present invention relates to control systems, and more particularly, to a method of robust multivariable predictive control (RMPC) techniques utilizing range controls.

In present day process control systems, many techniques are presently in use which utilize model predictive control techniques which control process variables to predetermined setpoints. Oftentimes the setpoints are a best estimate by the system operator of the value of the setpoint or set points. When a process is being controlled to a setpoint, the controller may not be able to achieve the best control performances, especially under process/model mismatch.

In order to enhance the controller performance, there is a need to provide a method for controlling a process which controls the process variables (i.e., controlled variables) by commanding each manipulated variable associated with the controller of the process control system to a corresponding range, i.e., each control specification having an upper bound and a lower bound, The result is that the Frobenius norm of the controller is minimized and thus the process is controlled within the desired tolerance of the product specification, the impact to the system is reduced, and results in a more robust controller.

SUMMARY OF THE INVENTION

Therefore, there is provided by the present invention, a controller which controls each controlled variable of a process to be within a corresponding predetermined range. A process control system includes at least one manipulated variable and at least one controlled variable. A method which provides robust control of a process, comprises the steps of initializing the robust control to have predetermined constraints of the manipulated variables and the controlled variables. The present values of the manipulated variables and the controlled variables are then obtained. New values are calculated for the controlled variables for a predetermined number of points in the future, such that the values of the controlled variables are within the predetermined range thereby obtaining an optimal robustness of the resultant controller. The manipulated variables are also calculated to be within predetermined constraints, and the controlled variables to fall within a predetermined range when controllable; otherwise, to keep the controlled variable constraint violations to a minimum. From a plurality of solutions, a most robust solution is selected. Then the manipulated variables are adjusted to cause the process control system to drive the values of the controlled variables to the calculated values.

Accordingly, it is an object of the present invention to provide a more robust controller for a process control system.

It is another object of the present invention to provide a more robust multivariable predictive controller.

It is still another object of the present invention to provide a more robust multivariable predictive controller wherein each controlled variable of the process is controlled to be within a range having an upper bound and a lower bound.

These and other objects of the present invention will become more apparent when taken in conjunction with the following description and attached drawings, wherein like characters indicate like parts, and which drawings form a part of the present application.

DETAILED DESCRIPTION

Figure 1:
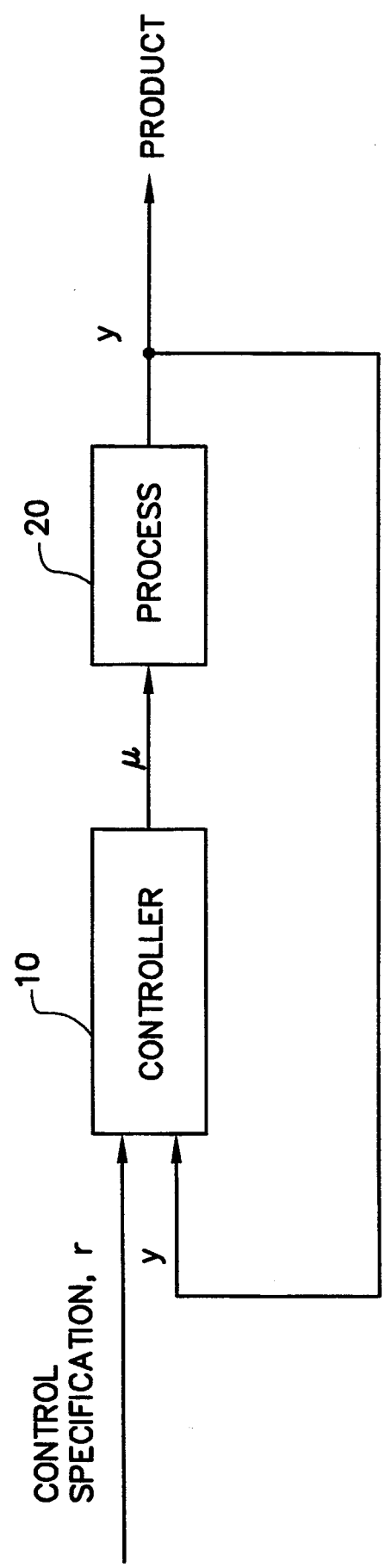
FIG. 1 shows a functional block diagram of a process control system in which the present invention may be utilized.

Referring to FIG. 1, there is shown a functional block diagram of a process control system in which the present invention may be utilized. A controller 10 has multiple outputs, which are coupled as input variables u to a process 20. The process 20 can include, for example, a plurality of elements which can be controlled such as valves, heaters, . . . Process variables y of process 20 include temperature, pressure, level, flow, . . . which govern product quality. The input variables (or manipulated variables) u, are defined as:

$$u = \begin{bmatrix} u_1 \\ u_2 \\ \cdot \\ \cdot \\ \cdot \\ u_m \end{bmatrix}$$

and the output variables (or controlled variables) cv, are defined as:

$$cv = \begin{bmatrix} cv_1 \\ cv_2 \\ \cdot \\ \cdot \\ \cdot \\ cv_n \end{bmatrix}$$

Thus, the process 20 is a dynamic process P(s) having m manipulated variables and n controlled variables. The controlled variables (cv) include $n_1$ regulated cv, $n_2$ restrained cv, and $n_3$ optimized cv. Generally, $$n \geq m \geq n_1$$

In the present invention, the control specification, r, (this is referred to as setpoint in previous systems) is defined as follows:

$$r = \begin{bmatrix} r_1 \epsilon [\underline{r_1}\ \overline{r_1}] \\ r_2 \epsilon [\underline{r_2}\ \overline{r_2}] \\ \cdot \\ \cdot \\ \cdot \\ r_n \epsilon [\underline{r_n}\ \overline{r_n}] \end{bmatrix}$$

For the regulated cv, the lower bound is equal to the upper bound, $\underline{r_1} = \overline{r_1}$. For the restrained cv, the upper bound is greater than the lower bound, $\overline{r_1}, > \underline{r_1}$, or there is either a lower bound only or there is an upper bound only. Finally, for the optimized cv, there is no bound at all.

Figure 2:
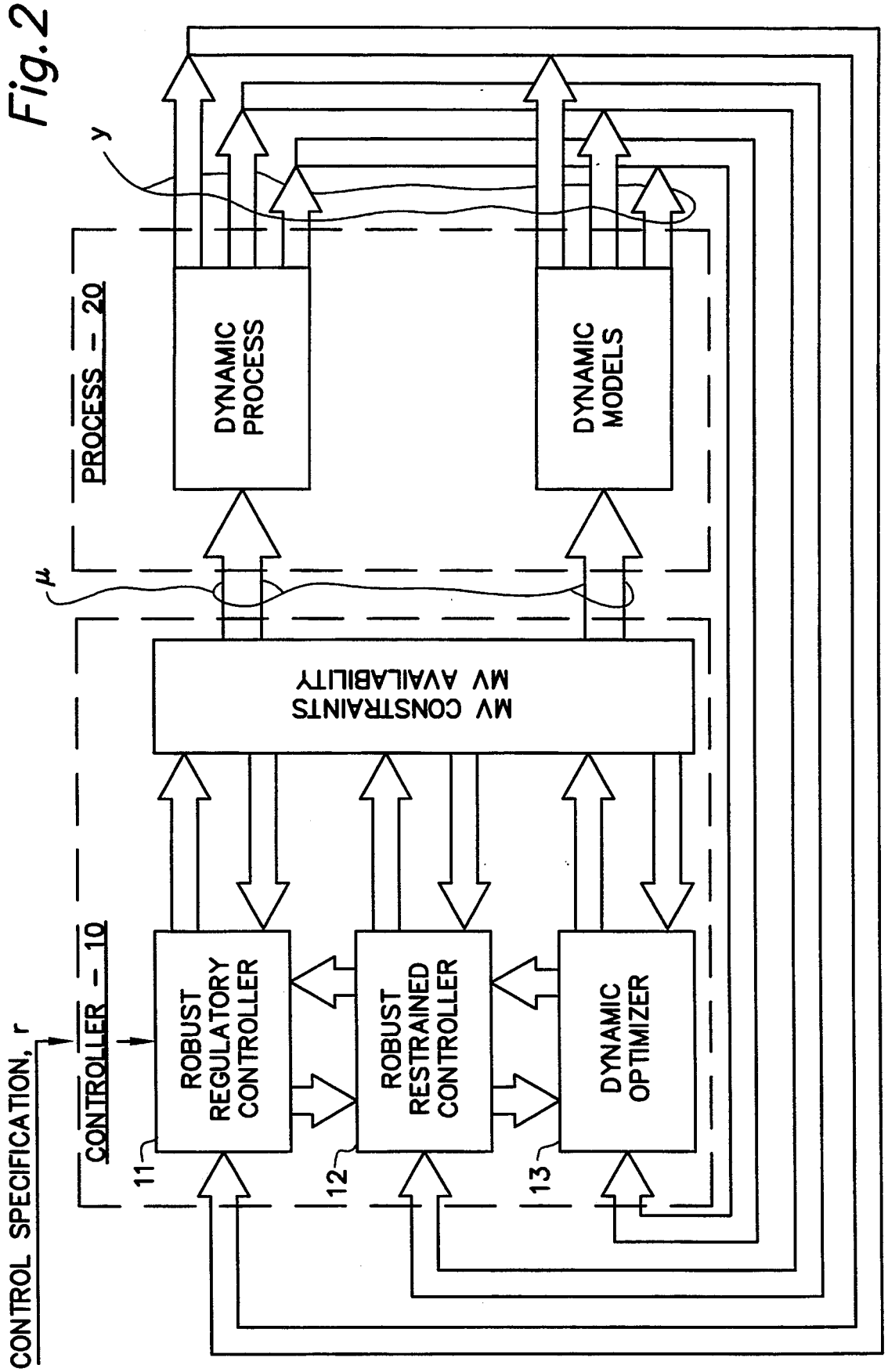
FIG. 2 shows the system of FIG. 1 which effectively includes three sub-controllers.

Referring to FIG. 2, there is shown the system of FIG. 1, which effectively includes three sub-controllers 11, 12, 13 to handle the three cases identified above. The range control function of controller 10 is formulated to handle the three cases identified above in accordance with:

$$\min_{x,y} 1/2 \| W(Ax - y) \|_2^2$$

Subject to:
$\underline{MV} \leq x \leq \overline{MV}$, and
$\underline{PV} \leq y \leq \overline{PV}$;

where, W is a user weighing matrix;

A is a matrix ($a_{ij}$ coefficients) that relates the process dynamics of an output to an input; y is range variables (extension of setpoint); and x is the manipulated variable u or $\Delta u$ (i.e, $\Delta u = u_{CURRENT} - u_{LAST}$), depending on application. $\underline{PV}$ and $\overline{PV}$ (process variable) is the range it is desired to have the process operate, and $\underline{MV}$ and $\overline{MV}$ is the range physical limits it is desired to have the process operate.

The controller has to find not only a best solution x, the movements of the manipulated variables u, but also must find an optimal point at which the process should be operating within the range, i.e., within the high-low-bound.

The solution to the formulation of the controller can result in one of three cases.

Case 1—there is a unique solution (of x*, y*) and Ax* ≠ y*;
Case 2—there is an infinite number of solutions (x*, y*) and Ax* = y*; and
Case 3—there is an infinite number of solutions (x*, y*) and Ax* ≠ y*.

Most of the solutions fall within Case 2 or Case 3. Case 1 indicates the process is not controllable.

For Case 2 and Case 3, it is desirable to find the most robust solution, i.e., find the solution which gives the smallest risk under model/process mismatch, which generally is the smallest move. Thus, for Case 2 and 3, it is desired to minimize the upper bound of the maximum singular value of the controller, $$\min_{q_{ij}} \| Q \|_{fro},$$

such that x* = Q × (predicted error) where Q is the controller matrix, $q_{ij}$ are the elements of the controller matrix Q, i.e., minimize the norm of the controller. Norm is the measure of the magnitude of the controller, i.e., an extension of the controller gain. In multivariable cases, the concept of gain is lost. Mathematically the gain is described by the "maximum singular value" or its upper bound, i.e., a Frobenius norm. Thus, the solution which corresponds to the smallest magnitude of the controller is found. This results in a greatly enhanced robustness of the controller.

As a result of the added complexity but increased advantages, computational load on the controller 10 is increased. In order to achieve added robustness and to handle PV constraints, the controller needs to compute where the manipulated variables should be and also where the controlled variables (cv) should be. The controller 10 solves a "staged" non-linear programming problem. First, the range control formulation is solved, and second (for a Case 2 or Case 3 solution) solve to minimize the magnitude of the controller. The programming can be converted into a "staged" semi-positive quadratic programming (QP) solution, well known to those skilled in the art.

Figure 3:
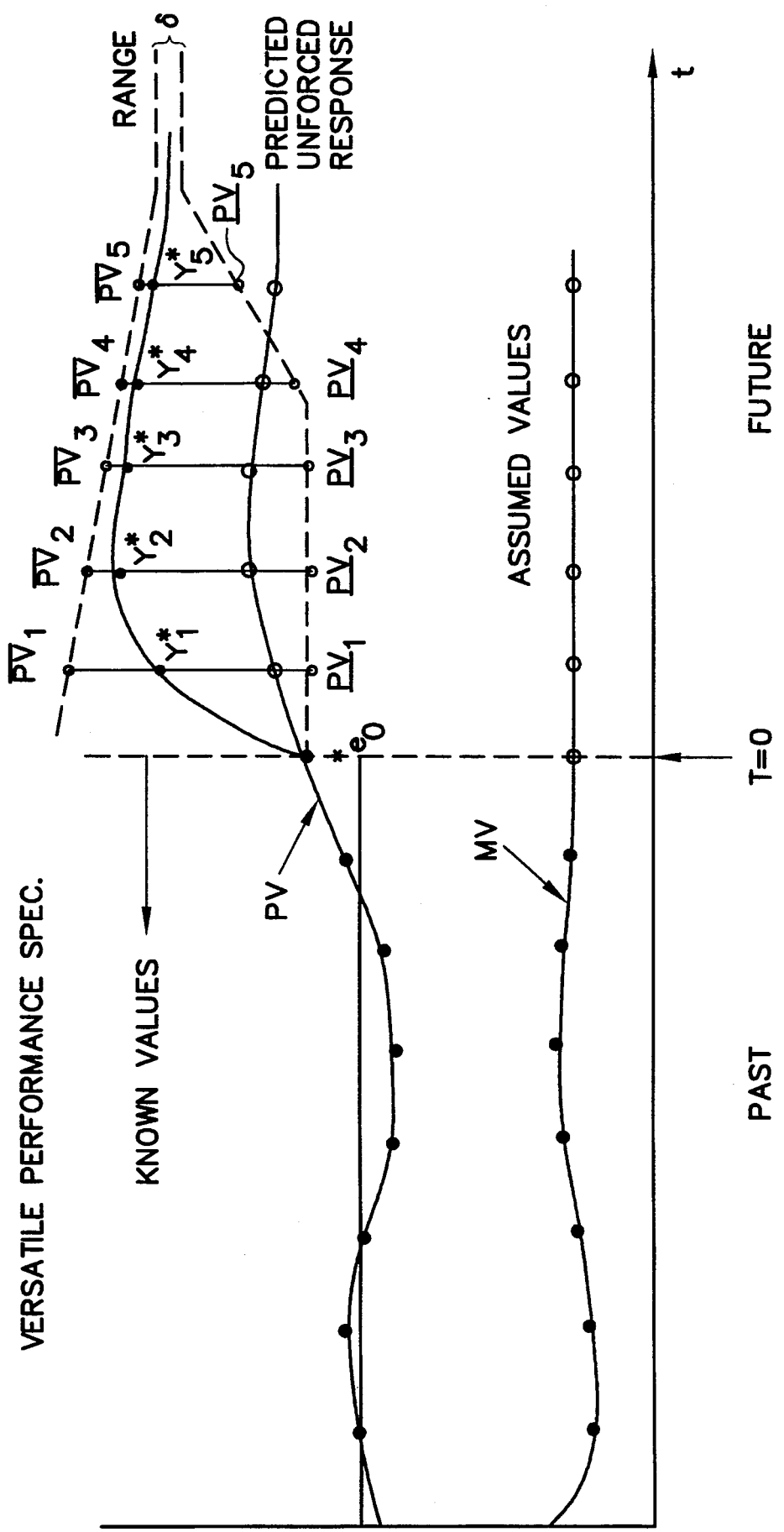
FIG. 3 shows a timing diagram of an application of the range control formulation of the present invention.

Referring to FIG. 3, there is shown a timing diagram of an application of the range control formulation of the present invention indicating a versatile performance feature. Here the process variable has a range. The process variable has a process variable upper and lower bound $\overline{PV}$ and $\underline{PV}$, respectively, specified by the user. Similarly, as discussed previously, the user specifies the upper and lower bounds for the manipulated variables (MV)(not shown). The current time is shown as t=0 and for each PV, in this example, there are five (5) PV values predicted ahead. If there are 20 PVs, then 100 PV values are to be entered, No. 1 thru 5 PV value pairs for the first PV, No. 6 thru 10 PV value pairs for the second PV, . . . and finally No. 96 thru 100 PV value pairs for the twentieth PV. Thus, $\overline{PV}_1$, and $\underline{PV}_1$, $\overline{PV}_2$ and $\underline{PV}_2$, $\overline{PV}_3$ and $\underline{PV}_3$, $\overline{PV}_4$ and $\underline{PV}_4$, and $\overline{PV}_5$ and $\underline{PV}_5$ values are entered by the user in this example. Here, in order to achieve robustness, the MV values are assumed to hold unchanged. The solutions of the range control formulation are $y^*_1, y^*_2, y^*_3,$ and $y^*_4, y^*_5$. Each of the solutions y* are within the PV bounds specified. By specifying a "funnel" (the specification of the PV high and low boundary), then a number of solutions are obtained because the trajectory can be anywhere within the funnel, and the one solution which corresponds to the least magnitude of the controller is determined.

Thus, the Range Control formulation handles all controlled variable constraints dynamically, even if the number of constrained controlled variables is greater than the number of manipulated variables, and exhibits greater control robustness.

Attached hereto as appendix I, is a paper entitled "Range Concept and Range Control Formulation", pages 1 through 19, which includes the detailed mathematics to support the detailed description section of the specification.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

Range Concept and Range Control Formulation

Appendix 1

For most MIMO control applications, there are often more PVs of control interest than MVs available to manipulate. Fortunately, most PVs of control interest are the PVs to be controlled within two distinct high and low constraints (or bounds). Those PVs are referred to as restrained PVs. There are usually no control performance required as long as the restrained PVs are within there bounds. For this reason, the restrained PVs can and should be treated differently form the traditional CVs (Controlled Variable) in order to gain additional control robustness that is often more desired than holding (in prediction) a selected number of restrained PVs straight lines within their physical constraints. Since the acronym "CV" (Controlled Variable) has been associated with a vague concept that we will further subdivide, it seems to be a good idea to extend the definition of CV and define two new subcategories under Controlled Variables.

| Definition | Meaning |
| --- | --- |
| Controlled Variable | PVs of control interest |
| Regulated | Regulated: PVs to be controlled at setpoints |
| Restrained | Restrained: PVs to be controlled within bounds |

Note that under this extended definition, the meaning of Controlled Variables is no long limited to the PVs to be controlled at their (internal or external) setpoints as implied or defined in many MIMO controller packages. Note also that one can further define subcategories in parallel to Regulated PVs and Restrained PVs, or as subcategories of either Regulated PVs or Restrained PVs.

It is noteworthy that, in this extended definition of the CV, the Regulated PV is just a special case of the Restrained PV, where the high and low bounds happen to equal to each other and become an equivalent setpoint. This yields a mathematically convenient *range control* formulation. In other words, the range control algorithm is formulated on the concept of range-the high/low bounds. The regulation at setpoint is treated as a special case, therefore the tasks of regulation and constraint handling are *mathematically unified*.

In general, the process model is a non-square system. Suppose the process is m-input-n-output system, or nxm system. And the vast majority of the process control task can be represented as follows, n1 outputs of the system are desired to be regulated (or controlled at setpoint), n2 outputs are desired to be controlled within their high-low bounds (some of those bounds can be infinite). Within the second category, n3 of n2 outputs are to be optimized (either minimized or maximized) with or without bounds.

Suppose the model can be described by finite step responses of multiple inputs, we can always represent the changes of multiple outputs in the following form, $$\Delta pv = A \, \Delta mv$$

where A is N×M matrix. N=n*(prediction points); M=m*(mv blocking points).

Furthermore, we would like to find most control-robust moves to achieve regulations on the n1 regulated process variables, maintain the n2 restrained process variables within their bounds respectively and, if possible, move the n3 optimized process variables to an optimum.

The controller to achieve the above tasks can be described referring to FIG. 2.

Where "robust regulatory controller," "robust restrained controller" and "dynamic optimizer" represent three different sub-controllers. Each sub-controller is discussed as follows, First, the on-line portion of robust regulatory controller and robust restrained controller can be formulated in following generic form, For all vector $\Delta mv \in R^M$ and a dynamic system matrix $A \in R^{N \times M}$, the corresponding change in outputs, $A \cdot \Delta mv$, forms the range space of A. When $\Delta mv$ is constrained in a box $B_{mv}$ (called my-box), i.e., $xl_i \leq \Delta mv_i \leq xu_i$, for i=1...M, $A \cdot \Delta mv$ forms a convex region RA in space $R^N$.

At any particular time interval in control, the predicted output changes, $\Delta pv \in R^N$, are, if possible, desired to be restrained in a predefined box $B_{pv}$ (called pv-box), $yl_j \leq \Delta pv_j \leq yu_j, \forall j=1...N$ For those regulated process variables, $yl_j = yu_j$, and for others, $-\infty \leq yl_j \leq yu_j \leq \infty$.

Geographically, the control task is to find, if $B_{pv} \cap RA = \{0\}$, the shortest distance (usually weighted) between two regions $B_{pv}$ and RA, or, if $B_{pv} \cap RA \neq \{0\}$, the most control-robust moves (for instance, $\| \Delta mv \|_2$-minimized solution) so that $A \cdot \Delta mv_{solution} \in B_{pv}$.

Let x denote $\Delta mv$ and y denote $\Delta pv$

Mathematically, the controller is formulated as $$\min_{x} \sum_{j=1}^{N} w_j \Phi^2 (a_j x, yl_j, yu_j) \qquad (3.3.1)$$

subject to $xl_i \leq x_i \leq xu_i, \forall i-1...M$

Where $a_j$ is the j-th row of A and $\Phi$ is define as $\phi(z, 1, u) =$ $$\Phi(z, l, u) = \begin{cases} l - z, & z \leq l \\ z - u, & z \geq u \\ 0, & \text{others;} \end{cases}$$

and $w_j > 0$ is a positive weight for j-th PV violation.

If multiple solutions exist, find the one that obtains the most robustness. For the sake of readability, the $\| x \|_2$-minimized solution is used here. $\| Q \|_{fro}$-minimized solution is discussed in next section, where Q is the MIMO controller.

This mathematical representation of range control formulation presents a number of advantages:

(a) It does not specify "at will" where within their bounds all the process variables should be at, except those regulated process variables. Instead, it lets the controller to figure out where the best place they should be at in order to gain control robustness or minimize the $\| Q \|_{fro}$.

(b) It allows the control designer to specify a pair of tighter high/low bounds for a regulated process variable at the end of the prediction horizon, and to specify a pair of looser high/low bounds for the same regulated process variable at the beginning and in the middle of the prediction horizon.

The computer realization of the controller formulation (3.3.1) can be devised by the following two steps corresponding to the first two sub-controllers, robust restrained controller and robust regulatory controller in the FIG. 3.1.

1) The task of the restrained controller is to test if $B_{pv} \cap RA = \{0\}$ and yield solution accordingly. The following Quadratic Programming (QP) problem is solved to find MV moves to minimize predicted PV violations.

$$\min_{x,y} \frac{1}{2} \| W(Ax - y) \|_2^2 \quad (3.3.2)$$

subject to
$x1_i \leq x_i \leq xu_i, \forall\ i = 1 \ldots M;$ and
$y1_u \leq y_j \leq yu_j, \forall\ j = 1 \ldots N.$
Where $W = \text{Diagonal}([w_1 \ldots w_N])$ is the diagonal weighting matrix. Denote the solution to (3.3.2) as $(x^*, y^*)$, and define $D^* = Ax^* - y^*$. If $D^* \neq 0$, then $B_{pv} \cap RA = \{0\}$. And multiple solutions could still exist. Then, $$\min_{x} \frac{1}{2} \|x\|_2^2 \quad \left( \text{or } \min_{x} \frac{1}{2} x^t W x \right) \quad (3.3.3)$$

subject to
$x1_i \leq x_i \leq xu_i, \forall\ i = 1 \ldots N$
$Ax - y = D^*$ ($D^*$ is the optimal violations); and
$y1_j \leq y_j \leq yu_j, \forall\ j = 1 \ldots M.$
Then $x_{3.3}^*$ to (3.3.3) is the controller MV moves for that time interval. Note that only when $B_{pv}$ and RA have parallel and kissing boundaries should solution to (3.3.3) differ from that to (3.3.2).

2) When $D^* = 0$, meaning $B_{pv} \cap RA \neq \{0\}$, and multiple solutions to (3.3.2) exist. The robust 2-norm-minimized solution can be found. (For $\|Q\|_{fro}$ minimized solution, see next subsection.) Its task is defined as follows, $$\min_{x} \frac{1}{2} \|x\|_2^2 \quad \left( \text{or } \min_{x} \frac{1}{2} x^t W x \right) \quad (3.3.4)$$

subject to
$x1_i \leq x_i \leq xu_i, \forall\ i = 1 \ldots M,$ and
$y1_j \leq a_j x \leq yu_j, \forall\ j = 1 \ldots N.$ One of the most important advantages of the range control algorithm is that the resultant controller tries to control as many CVs as possible. The control performance on restrained PVs are essentially same as that of the regulated PVs. The user does not have to specify explicit CVs and implicit CVs (or recoupled CVs and undecoupled CVs).

Another obvious advantage is gaining additional robustness without any model uncertainty descriptions. The gain of robustness is based on the fact that there are often infinite number of solutions to the range control problem (3.3.2).

It is noteworthy that range control algorithm does not differentiate the regulatory controller from restrained controller. However, the off-line rain-max algorithm does treat the two controllers differently when robust stability and robust control performance are considered. The fundamental difference lies in the fact that the regulatory controller alone is a linear controller after all, but the restrained controller is not. Therefore the combination of the two are not linear, since the restrained controller interact with the regulatory controller.

RANGE CONTROL NUMERICAL SOLUTION TECHNIQUES

Given a limited computing resource, the main numerical difficulties for range control algorithm are as follows, 1) The size of the original formulation (3.3.2) is much bigger than conventional control formulations. The range control formulation is in the space of $R^{(N+M)}$, while conventional control is in the space of $R^M$. Notice that N usually $\geq M$ and that CPU time required for QP problem is usually proportional to $(\text{size})^2 \sim (\text{size})^3$.

2) The additional control robustness comes from finding the best solution when there are multiple (usually infinite) solutions. It adds additional complexity to the numerical solution technique.

3) The resultant controller becomes nonlinear, at least piece-wise linear. It adds significant difficult to off-line robust control design.

On the other hand, this range control formulation possesses some mathematically-convenient features that conventional control formulations may not have. Those features are as follows, 1) The constraints in formulation (3.3.2) are all simple bounds. There are many useful numerical treatments can be employed to simplify the numerical procedures.

2) Many terms in formulation (3.3.2) may vanish at the solution. Thus not all the terms need to join the iterations.

3) The most control robust solution will be found under the condition of multiple solution. This helps significant to reduce the sensitivity of blocking to the final control solution. Also, there is little need for specifying initial part of the internal trajectory.

Norms and Scaling

Norms and scaling almost always work together. Without proper scaling, norms could be misleading; without a proper norm definition, a control formulation can hardly yield the robustness to counteract all possible uncertainties.

MAXIMUM SINGULAR VALUE, FROBENIUS NORM AND 2-NORM

For any MIMO controller, it can be expressed in a matrix form as follows, $$\Delta MV = Q \Delta e$$

Where $\Delta MV$ is the predicted MV moves and $\Delta e$ is an error term.

For the range control algorithm, the error calculation is slightly different. The final goal is to find a robust MV move that satisfy the following, $$\Delta \underline{YB} \leq H\ \Delta MV \leq \Delta \overline{YB}$$

Thus, the change in error $\Delta e$ should be calculated as follows (see Theorem 1 for more rigorous expression), $$\Delta e_i = \begin{cases} \Delta \overline{YB}_i, & \Delta \overline{YB}_i < 0 \\ \Delta \underline{YB}_i, & \Delta \underline{YB}_i > 0 \\ \text{to be determined, otherwise} \end{cases}$$

and $$\Delta \overline{YB}_i = yu_i - \bar{y}_i$$
$$\Delta \underline{YB}_i = yl_i - \bar{y}_i$$

where $\Delta \overline{YB}_i$ and $\Delta \underline{YB}_i$ are i-th high and low PV a-bounds respectively, and $\bar{y}_i$ is the predicted i-th PV (in H matrix arrangement).

There are three norms involved in RMPC controller as follows,
1. Maximum singular value of the RMPC controller
2. Frobenius norm of the RMPC controller
3. 2-norm of control moves by RMPC controller The first two are matrix norms and the third is a vector norm. They are closely related. However their relationships are not always straightforward. (Golub and Van Loan)

Minimizing the controller's maximum singular value (the controller norm) is the final goal. But this task is too difficult to tackle at every execution time on-line. Frobenius norm is a good, close upper bound of the maximum singular value when properly scales. And, minimizing Frobenius norm of the RMPC controller is much less expensive CPU time-wise.

The unweighted robust control solution will yield a default control performances on each CV (including Reg and Res PVs). It is often desired, from the user's stand point view, to minimize the maximum singular value of a weighted RMPC controller. The weights allow the user to specify mainly two things: 1) the relative control performance on each PV of control interest; and 2) to use which MVs more to control which CV.

A weighted Frobenius norm of the RMPC controller is then the upper bound of the weighted maximum singular value. When such a solution exist (the closed-loop system has no sustained constraint violations), it can be expressed as follows, Let $Q = [q_{ij}]_{M \times N}$, and $w_{ij} \geq 0$ $$\min_{q_{ij}} \sum_{i=1}^{M} \sum_{j=1}^{N} w_{ij} q_{ij}^2 \quad (3.4.1)$$

subject to $\Delta \underline{YB} \leq H \, Q \, \Delta e \leq \Delta \overline{YB}$
where $\Delta e$ can be expressed as follows, $$\Delta e_i = \begin{cases} \Delta \overline{YB}_i, & \text{when } i\text{-th constraint is binding at its high bound} \\ \Delta \underline{YB}_i, & \text{when } i\text{-th constraint is binding at its low bound} \\ 0, & \text{otherwise} \end{cases}$$

Denote $H_-$ as the collection of the rows in H that are binding at the solution to (3.4.1). Denote $Q_-$ as the collection of the corresponding binding columns in Q. Note that the rest of columns in Q are all zeros. Then, (3.4.1) can be rewritten equivalently as follows, Let $Q = [q_{ij}]_{M \times N}$, and $w_{ij} \geq 0$ $$\min_{q_{ij}} \sum_{i=1}^{M} \sum_{j=1}^{N} w_{ij} q_{ij}^2 \quad (3.4.2)$$

subject to $H_- Q_- = I$ (an identity matrix)

Theorem 1:

If the weights are all equal, $w_{ij} = w$, $\forall$ ij, then (3.4.1) is to minimize the Frobenius norm of matrix Q or (3.4.2) is to minimize the Frobenius norm of matrix $Q_-$; and the solution 1) is equivalent to minimizing the 2-norm of the MV moves, $\|\Delta MV\|_2$.
2) can be expressed as follows $$Q_- = H_-^T [H_- H_-^T]^{-1}$$

where $H_-$ is collection of the rows of H that are binding at the solution to (3.4.1).

Q can be constructed from $Q_-$ by adding zero-columns to the corresponding positions where H has non-binding rows.

Proof:

Denote $Q_- = [q_1, q_2 \ldots q_p]_{r \times p} = [q_{ij}]$, $(r = M > p)$ the (3.4.2) can be rewritten as, $$\min_{q_{ij}} \sum_{i=1}^{r} \sum_{j=1}^{p} w \, q_{ij}^2 = w \min_{q_{ij}} \sum_{i=1}^{r} \sum_{j=1}^{p} q_{ij}^2 = w \min_{q_j} \sum_{j=1}^{p} q_j^2$$

subject to $H_- Q_- = H_- [q_1, q_2 \ldots q_p] = [e_1, e_2 \ldots e_p] = I$ pxp.

Notice that the constraints are separable in terms of $q_j$ that is squared and summarized in the objective function, thus the original minimization problem is equivalent to the following p sub-problems:

$$\min_{q_j} q_j^2 = \min_{q_{ij}} \sum_{i=1}^{r} q_{ij}^2 \quad (3.4.3)$$

$$j = 1, 2 \ldots p$$

subject to $H_- q_j = e_j = [0 \ldots 0 \, 1 \, 0 \ldots 0]^T$,
(j-th element is 1)

where $e_j = [0 \ldots 0 \, 1 \, 0 \ldots 0]^T$ is an $r \times 1$ unit vector.

For each sub-problem, say, j=k, the solution to (3.4.3) is as follows, (Golub & Van Loan, 1985)

$$q_k = \sum_{i=1}^{p} \frac{1}{\sigma_i} (u_i^T e_k) v_i \quad (3.4.4)$$

here $u_i$, $v_i$ and $\sigma_i$ are from the singular value decomposition of $H_-$ as follows, $$U^T H_- V = \Sigma$$

where $U = [u_1, u_2 \ldots u_r]$, $V = [v_1, v_2 \ldots v_p]$ and $\Sigma = [\text{diag}(\sigma_1, \sigma_2 \ldots \sigma_p), 0]$.

Note that $H_-$ can also be reconstructed as (3.4.5):

$$H_- = U_p \Sigma_p V_p = \sum_{i}^{p} \sigma_i u_i v_i^T \quad (3.4.5)$$

where $U_p$, $V_p$ and $\Sigma_p$ are partitions of U, V and $\Sigma$, $U_p=[u_1, u_2 \ldots u_p]$, $V_p=[v_1, v_2 \ldots v_p]$ and $\Sigma_p=\text{diag}(\sigma_1, \sigma_2, \ldots \sigma_p)$.

Furthermore, $q_k$ in (3.4.4) can be rewritten as follows, $$q_k = \sum_{i=1}^{p} \frac{1}{\sigma_i}(u_i^T e_k) v_i = \sum_{i=1}^{p} \frac{u_{k,i}}{\sigma_i} v_i = \sum_{i=1}^{p} \frac{1}{\sigma_i}(v_i u_i^T) e_k \quad (3.4.6)$$

and the optimal solution $Q_-$ can be constructed as follows, $$Q_- = [q_1 \ldots q_p] = \left[ \sum_{i=1}^{p} \frac{1}{\sigma_i}(v_i u_i^T) e_1 \ldots \sum_{i=1}^{p} \frac{1}{\sigma_i}(v_i u_i^T) e_p \right]$$

$$= \sum_{i=1}^{p} \frac{1}{\sigma_i}(v_i u_i^T)[e_1 \ldots e_p] = \sum_{i=1}^{p} \frac{1}{\sigma_i}(v_i u_i^T) I =$$

$$\sum_{i=1}^{p} \frac{1}{\sigma_i}(v_i u_i^T)$$

$$= V_p [\text{diag}(\sigma_1 \ldots \sigma_p)]^{-1} U_p^T = V_p [\Sigma_p]^{-1} U_p^T =$$

$$V_p \Sigma_p [\Sigma_p^2]^{-1} U_p^T$$

$$= V_p \Sigma_p^T U_p^T U_p [\Sigma_p^2]^{-1} U_p^T = H_-^T [U_p \Sigma_p^2 U_p^T]^{-1}$$
$$= H_-^T [U_p \Sigma_p V_p^T V_p \Sigma_p U_p^T]^{-1} = H_-^T [H_- H_-^T]^{-1}$$

Note that $H_-^T[H_- H_-^T]^{-1} \Delta e_-$ is also the solution to minimizing $\|\Delta MV\|_2$ subject to the same set of constraints as follows $$\min_{\Delta MV^i=1} \sum^M MV_i^2 \quad (3.4.7)$$

subject to $H_- \Delta MV = \Delta e_-$

Thus, solution to (3.4.7) is the same of that to (3.4.1).

Q.E.D.

When weights in (3.4.1) are not equal, the vector 2-norm of control moves and Frobenius norm of the controller are related, but in a much less obvious fashion.

OPTIMAL SCALING AND USER WEIGHTINGS

Optimal Scaling

The purpose of scaling is twofold. 1) improve numerical "behavior" of the working system; 2) make the norms more meaningful. Both tasks can be achieved by decreasing or even minimizing the condition number of working matrix with scaling. In a very general form, scaling can be performed by $$\min_{D_r, D_c} \text{cond}(H_s) \quad (3.4.*1)$$

and $$H_s = D_r H D_c$$

where H is the original model matrix, $H_s$ is the scaled working model. $D_r$ is a left transformation matrix, and $D_c$ is a fight transformation matrix. One drawback with this approach is the lack of efficient algorithms to compute (3.4.*1), since the condition number is a very complex function of $D_r$ and $D_c$.

One efficient algorithm was found when $D_r$ and $D_c$ are reduced to be diagonal matrix, $D_r$ for row scaling and $D_c$ for column scaling. Note that the condition number of $H_s$ is still a very complex function of $D_r$ and $D_c$.

Note that $D_r$ and $D_c$ can be a good sized vectors. It is almost infeasible CPU time-wise to search in $[D_r, D_c]$ space since condition number is a fairly expensive function to be computed in the gradient and Hessian matrix. A special optimization algorithm is formulated for (3.4.*1). Its search steps are based upon the following algorithm to improve convergence dramatically. At k-th iteration, $$D_r(k) = \text{diag}([d_{r,i}]), \text{ with } d_{r,i} = \frac{\sqrt{\|H\|_{fro}}}{\|hr_i\|}$$

$$D_c(k) = \text{diag}([d_{c,j}]), \text{ with } d_{c,j} = \frac{\sqrt{\|H\|_{fro}}}{\|hc_j\|}$$

$$H = D_r(k) \ldots D_r(l) \, H \, D_c(l) \ldots D_c(k)$$

where $hr_i$ and $hc_j$ are i-th row vector and j-th column vector of H respectively. The iteration stops when cond(H) can not be improved. In about 50 test cases with different matrix size, it take 2–5 steps to reach an optimum. The longest is 12 steps with tolerance is set to be 1E-4.

Compare this approach with the ones recommended or used in LINPACK, this new approach gives better scaling or small cond($H_s$). The speed is comparable to the LINPACK's simple non-optimal scaling, and dramatically faster than LINPACK recommended optimal scaling.

The following is an real-life example, H is the FCCU Cat-Cracker gain matrix

H =

| | | | |
|---|---|---|---|
| −0.0230 | −0.0250 | 0.0560 | 0.1900 |
| −0.0175 | 0.1900 | −0.0100 | −0.0600 |
| 0.2750 | 2.3500 | 1.0000 | 1.2900 |
| 0 | 0 | 0 | 2.0400 |
| −0.0050 | −0.0200 | 0.0080 | 0.0106 |
| 0.2000 | 3.1500 | −0.0100 | −0.0120 |
| 0.1450 | 12.8000 | −12.1600 | −7.6700 |
| 0.3690 | 29.2500 | −16.8400 | −13.2900 |
| 0.1580 | −2.4500 | 7.4800 | 5.8900 |

$H_s =$

| | | | |
|---|---|---|---|
| 1.2838 | −0.1418 | 0.6066 | 1.3978 |
| −1.2482 | 1.3773 | −0.1384 | −0.5640 |
| 1.2178 | 1.0577 | 0.8594 | 0.7530 |
| 0 | 0 | 0 | 2.0563 |
| −1.6765 | −0.6816 | 0.5205 | 0.4684 |
| 1.0298 | 1.6485 | −0.0100 | −0.0081 |
| 0.1033 | 0.9269 | −1.6813 | −0.7203 |
| 0.1569 | 1.2641 | −1.3896 | −0.7448 |
| 0.1960 | −0.3089 | 1.8010 | 0.9632 |

$D_c =$ 0.3015
0.0306
0.0585
0.0397

$D_r =$ 185.13
236.57
14.688
25.367
1112.1
17.079
2.3632
1.4104
4.1152 cond(H) = 206.18

-continued $$\text{cond}(H_s) = 2.3634$$

Notice that the elements in the scaled $H_S$ is much more evenly distributed, meaning all elements get closer to unity. And the condition number of $H_S$ is much smaller than that of H.

It is also noticed that scaling on the full dynamic matrix does not provide much additional advantages over scaling on just the gain matrix and then scale the dynamic elements the same way as their gain element. The primary reason is that gain is part of dynamics and each SISO portion is always somewhat parallel. For RMPC, is seems to be a good idea to obtain the scaling just based on gain matrix, then apply the scaling to all dynamic element. The optimal scaling will be done off-line. On-line it will "merge" with the user weights (scaling) and apply to the H matrix.

User Weightings

RMPC user may wish to use some MVs relatively more than the others, or to have relatively less constraint violations of some PVs than that of others. It is necessary to provide a user weighting on top of the optimal internal scaling. The user MV weighting can be directly applied (multiplied) to $D_c$. However the user PV violation weighting should ideally be applied (multiplied) to $D_r$ only when there is sustained violation.

A note: User PV weighting can be interpreted as relative control performance weighting as well, since PV weighting are always effective on regulated CVs and PV weighting on restrained CV are effective when PV constraints are violated.

ON-LINE SOLUTION AND STATUS DISPLAY

It is desired to give the user some indication what the RMPC controller is doing at any time. An easy indication is to display the status of the controller. The status used in DPC seems to be well accepted by the operators and plant engineers. They are as follows,

| Status | Full Name | Meaning |
|--------|-----------|---------|
| OFF | control is not on | Only data acquisition is on. |
| INIT | INITializing | Initialize RMPC downstream controllers. |
| REG | REGulating | No active restrained PV constraints. |
| OPT | OPTimizing | All PVs are within HI/LO bounds. |
| CNS | CoNStraint handling | At least one restrained PV is constrained. |
| CCF | Constraint ConFlicting | Handling constraint conflicts. |
| CMV | Constrained MV | MV constraints are excessively stringent. |

The following are detailed description of the RMPC Controller statuses

1. OFF status indicates that the RMPC Controller is not on-line, but the data acquisition part of the RMPC Controller is still running and displaying the current PV and MV values.

2. INIT status indicates that the RMPC Controller has just turned from the mode OFF to ON. The RMPC Controller initializes itself and establishes the connections with the downstream controllers. Normally, the RMPC Controller should show the INIT status for only one execution interval. Exceptions can arise when the downstream controllers are not ready at the end of that execution interval. The RMPC Controller waits and remains in the INIT status for a predetermined number of execration intervals.

3. REG indicates that the RMPC Controller is controlling the regulatory PVs to their setpoints. The Regulatory Controller functions as long as the RMPC Controller is set ON. The REG status is always active but only displays when the following two conditions are both satisfied:

None of the restrained or optimized PVs have any active constraints

Optimizer move size is set to zero, or at least one of the regulatory PVs is outside its regulatory band region.

When both conditions are met, the REG status displays.

If one of the regulatory PVs is outside its regulatory band region, the Regulatory Controller takes precedence and the Dynamic Optimizer is set in a waiting mode. This may not seem meaningful when the RMPC Controller is running on the perfect model process in simulations. However, when there is model-process mismatch, the RMPC Dynamic Optimizer is prevented from pushing the process too aggressively. This safeguards the optimizer move-size, and reduces the retuning effort when model-process mismatch becomes significant.

The OFT, CNS, CCF and CMV statuses are mutually exclusive; that is, only one of them can be a valid status at a time. The regulatory control status is implied when the OFT, CNS, CCF and CMV statuses display. Therefore, when the REG status displays, it also indicates that none of the OFT, CNS, CCF and CMV statuses are active.

4. OPT status indicates that the RMPC Controller is optimizing the process operation according to the economical objective (see Equation (3). This status will be displayed only when:

None of the Restrained or Optimized PVs have an active constraint.

Optimizer move size is set to a positive value.

None of the regulated PVs are outside their regulated band regions. Regulatory control is implied.

5. CNS status indicates that the RMPC Controller is handling the predicted or actual constraint violations of the restrained and optimized PVs. It serves as an early warning when the violations are predicted. Internally, the RMPC Restrained Controller is activated and the Dynamic Optimizer is set in a waiting mode. Regulatory control is implied.

6. CCF status indicates a special subset of the CNS status when RMPC detects that at least a pair of the severely conflicting constraints is active and special algorithm is employed to handle that. This status is rare since most of the conflicting constraints can be resolved in the robust fashion within the predicted horizon under the CNS status.

The CCF status usually comes with an abnormal situation: one of the major MVs is lost, for instance, or one PV measurement is exceedingly biased, causing an excessively constrained situation. Internally the Restrained Controller minimizes the weighted violations. CCF is a (somewhat) predicted indication, and it usually comes on for a few execution intervals and goes away. In a noisy environment, it could come and go a few times.

When CCF displays, some engineering assessment is recommended to both identify the cause and to resolve, if necessary. This could be extremely helpful in the commissioning phase of the RMPC project. It is possible to introduce an artificial pair of conflicting constraints by specifying some stringent high or low constraints.

Regulatory control is implied. However, there might be an offset if the CCF status persists.

7. CMV status indicates that them are too many excessively stringent MV constraints for the RMPC Controller to function normally. This status displays when there are fewer unconstrained MVs than the number of regulated PVs.

The CMV status warns that too many downstream controllers have been turned off.

Regulatory control is implied. However, there might be an offset if the CMV status persists.

We claim:

1. In a process control system having a controller for providing robust control to a process, the process further having at least one manipulated variable and at least one process variable, a method for providing the robust control of a process, comprising the steps of:
   a) initializing the controller to have predetermined constraints of the manipulated variables and the process variables;
   b) obtaining present values of the manipulated variables and the process variables said process variables corresponding to measurement parameters of the process;
   c) calculating new values of the process variables for a predetermined number of points in the future in order to have the values of the process variables within the predetermined range to obtain an optimal robustness of the resultant controller, the manipulated variables being within predetermined constraints, and the process variables falling within a predetermined range when controller; otherwise, keeping process variable constraint violations to a minimum;
   d) from a plurality of solutions, selecting a most robust solution; and
   e) controlling the process in accordance with the most robust solution.

2. In a process control system, a method for providing robust control of a process according to claim 1, wherein the step of controlling comprises the steps of:
   a) outputting the manipulated variables of the most robust solution of step (d) of claim 1 to the process; and
   b) adjusting the process in response to the manipulated variables to cause the process control system to drive the values of the process variables to the calculated values of step (d) of claim 1, thereby providing the control of the process.

3. In a process control system, a method for providing robust control of a process according to claim 2, wherein the step of selecting comprises the step of:
   a) determining a set of controlled variables which correspond to minimum controller magnitude.

* * * * *

UNITED STATES PATENT AND TRADEMARK OFFICE
CERTIFICATE OF CORRECTION

PATENT NO. : 5,351,184
DATED : SEPTEMBER 27, 1994
INVENTOR(S) : ZHUXIN J. LU, GLENDALE;
J. WARD MAC ARTHUR, SCOTTSDALE;
BRIAN C. HORN, PHOENIX, ALL OF ARIZONA

It is certified that error appears in the above-indentified patent and that said Letters Patent is hereby corrected as shown below:

COLUMN 16, LINE 8, CANCEL "CONTROLLER" AND SUBSTITUTE --CONTROLLABLE--.

Signed and Sealed this

Eleventh Day of April, 1995

Attest:

BRUCE LEHMAN

Attesting Officer        Commissioner of Patents and Trademarks